(12) United States Patent
Taylor et al.

(10) Patent No.: US 6,227,094 B1
(45) Date of Patent: May 8, 2001

(54) BRAIDED TUBULAR ARTICLE

(75) Inventors: Robert S. Taylor, West Chester, PA (US); J. Sellers Kite, III, Hilton Head, SC (US)

(73) Assignee: Federal-Mogul Systems Protection Group, Inc., Exton, PA (US)

( * ) Notice: Subject to any disclaimer, the term of this patent is extended or adjusted under 35 U.S.C. 154(b) by 0 days.

(21) Appl. No.: 09/299,247

(22) Filed: Apr. 26, 1999

Related U.S. Application Data

(60) Provisional application No. 60/083,213, filed on Apr. 27, 1998.

(51) Int. Cl.[7] ......................................... D04C 1/00
(52) U.S. Cl. ............................................. 87/9; 87/8
(58) Field of Search ..................... 87/7, 5, 6, 8, 1, 87/9

(56) References Cited

U.S. PATENT DOCUMENTS

| | | |
|---|---|---|
| 1,814,224 | 7/1931 | Murphy . |
| 2,114,274 | 4/1938 | Huppert ................... 96/26 |
| 3,315,559 | 4/1967 | Cohen ...................... 87/2 |
| 4,045,848 | 9/1977 | Whitaker ................. 28/218 |
| 4,437,951 | 3/1984 | Bissot et al. ............. 204/98 |
| 4,741,087 | 5/1988 | Plummer, Jr. ............ 29/446 |
| 4,777,859 | 10/1988 | Plummer, Jr. .............. 87/7 |
| 5,197,370 | 3/1993 | Gladfelter ................. 87/7 |
| 5,252,193 | 10/1993 | Powers ................... 204/252 |
| 5,264,090 | 11/1993 | Hiyoshi et al. ............ 204/98 |
| 5,384,019 | 1/1995 | Keating et al. ........... 204/252 |
| 5,505,117 | 4/1996 | Dunlap et al. ............. 87/1 |
| 5,619,903 | * 4/1997 | Rogers et al. ............. 87/7 |

FOREIGN PATENT DOCUMENTS 0 499 089    8/1992    (EP) .

\* cited by examiner

*Primary Examiner*—Danny Worrell
(74) *Attorney, Agent, or Firm*—Synnestvedt & Lechner LLP

(57) ABSTRACT

A braided tubular article (FIG. 1) comprises a tubular form of helically braided yarns to which is coupled a plurality of spaced axially extending restraining elements, conveniently as warp elements braided with the tubular form. The yarns are braided with a small helix pitch that permits the tubular form to be extended axially and contract radially onto a substrate as a protective sleeve. The warp elements are essentially inextensible and frictional coupling between then and the braid yarns inhibits extension of the article, permitting it to be handled and passed over a substrate before applying a deliberate extension force to overcome the friction and contract it into the substrate. The restraining elements may be other than branded warp elements and the extension-inhibiting coupling may be a disruptable bond instead of, or supplementing, friction. Frictionally acting warp elements permit the extended article to assume a bent form in one or more directions. The warp elements may be positionally floating or anchored with respect to the braid yarns.

15 Claims, 1 Drawing Sheet

BRAIDED TUBULAR ARTICLE

RELATED APPLICATION

This application claims priority of U.S. Provisional Patent Application No. 60/083,213, filed Apr. 27, 1998.

FIELD OF INVENTION

This invention relates to a braided tubular article, such as a sleeving product, and is particularly concerned with features and techniques for facilitating the installation of such article over an elongate member, such as a wire bundle.

BACKGROUND OF THE INVENTION

Tubular articles, in the form of woven, braided and knitted sleeving products have been made typically from a variety of plastics materials and mineral materials, such a glass fiber, as is well known in the art. Such products are in widespread use, for example, in the automotive and aerospace industries for bundling and protecting members such as wires, cables and tubing, for the reduction of noise and for protection of hoses and various other members from abrasion or from the deleterious effects of heat in high temperature environments.

It is a recognized problem with sleeving products or sleeves of this sort that, for some applications, installation thereof over elongated substrate members can be labor intensive. This is because of the requirement that the sleeve fit relatively snugly over the members to be protected in order to reduce vibration-induced noises and to maximise the protection afforded. As a consequence, a braided sleeve construction is preferred in which a first set of yarns extending helically in one rotational direction about a longitudinal axis is interbraided with a second set of yarns extending helically in the opposite rotational direction about said axis. Such braided sleeving can be axially compressed to reduce the helix pitch and thus correspondingly radially expanded for relatively easy advancement over the members to be protected, thereafter being stretched out axially, that is, extended, to increase the helix pitch and cause radial contraction onto the members.

However, it is sometimes difficult for the installer to maintain the tubular sleeve in the axially-compressed and radially expanded state while at the same time feeding it onto the members to be protected. As a consequence, there is a need for product improvements which facilitate installation of tubular articles such as sleeving products, particularly where access to the members to be covered is limited.

In this specification, to avoid misunderstanding of the complementary expansion and contraction which occurs in the longitudinal and radial directions, increase in the radial direction is referred to as "expansion" whereas increase in the longitudinal direction is referred to as "extension".

It is an object of the present invention to provide a braided tubular article, such as a sleeve, of simple and cost effective construction which mitigates the difficulties hitherto experienced in placing such tubular articles on, and contracting onto, elongate members.

In accordance with the present invention a braided tubular article comprises a plurality of yarns extending helically with respect to a longitudinal axis and interbraided with respect to each other into a tubular form of small helix pitch capable of significant axial extension and axial contraction by relative movement between the yarns, and is characterized by a plurality of restraining elements extending axially of the tubular form and coupled to the braided yarns to inhibit, by said coupling, axial extension of the tubular article in response to an axial force applied to the tubular form, and to permit axial extension of the tubular article in response to a said axial extension force in excess of a predetermined threshold level.

Thus, a braided tubular article according to the invention is braided in the radially-expanded, backed-up state and maintained in that state by the coupling between the restraining elements and braided yarns. This facilitates installation over elongate wires or other members such as hoses or cables. Once the article is threaded over the members and the braided tubular form is pulled axially with a force above the threshold to overcome the coupling between restraining elements and braid yarns, it extends axially and the tubular wall thereof contracts radially and possibly, but not essentially, into contact with members to be protected. After the article is axially extended it will stay in the radially contracted state due to frictional effects between the braided yarns.

The restraining elements may take any elongate form suitable for the function but preferably comprise warp elements braided with said tubular form. More preferably the warp elements are coupled to the braided yarns of the tubular body to inhibit said axial extension by frictional engagement between them. Each restraining element preferably is substantially inelastic lengthwise thereof. Such frictional effects, overcome during axial extension, exist following such extension and may, particularly in combination with such inelastic elements, have effect also in subsequently inhibiting axial contraction of the extended article.

Notwithstanding the form of the restraining elements, such coupling may comprise, or be supplemented by, a disruptable adhesive bond. Insofar as it is known to treat a braided tubular article by impregnating or coating with an anti-fraying agent to prevent fraying of cut ends and unraveling of the braided structure, the tubular article of the present invention may likewise be treated for the same purpose and also to effect a disruptable bond between the restraining elements and braid yarns. A water based agent is preferred, and more preferably a water based acrylic composition, such as a very dilute acrylic latex, although other agents may be used.

Restraining elements formed as warp elements in accordance with the preceding paragraphs are naturally essentially floating with respect to the braided tubular forms in that when the tubular article is extended beyond its initial manufactured length the restraining elements, being of lesser length than the extended article, end up at indeterminate axial positions. If it is desired to determine the final position of each restraining element, it may be coupled at a single predetermined attachment point thereof to the braided tubular form in a permanent attachment therewith.

Where each restraining element comprises a warp element braided with the yarns into the tubular article, it may comprise the same material as the interbraided yarns. It may comprise an individual monofilament or bundle of monofilaments. The monofilaments of such a bundle, which may comprise up to about three such monofilaments, may be twisted together or may be untwisted.

The warp elements (and interbraided yarns) may be made from a wide variety of materials, particularly those known because of their properties and stability as engineering thermoplastics, for example, being selected from the materials comprising nylon, peek and polyester.

For certain applications the warp elements may comprise multi-filament elements and/or braided or knitted warp beads, for example, multi-filament mineral fiber yarns.

Although any number of restraining elements may be employed, they are preferably disposed equidistantly spaced with respect to each other about the circumference of the tubular article. Conveniently, restraining elements in the form of the aforementioned warp elements are provided in pairs, the elements of each pair being diametrically opposed. With one pair of diametrically opposed warp elements the tubular article can, in addition to retaining the axially extended dimension, assume and retain a bent shape in a plane containing the warp elements, while having flexibility in respect of bending out of said plane. With two pairs of diametrically opposed warp elements the tubular article can retain its shape in three dimensions, that is, the axially extended dimension and in (wholly or in combination) the orthogonal planes containing the warp elements.

DETAILED DESCRIPTION OF THE PREFERRED EMBODIMENT

Figure 1:
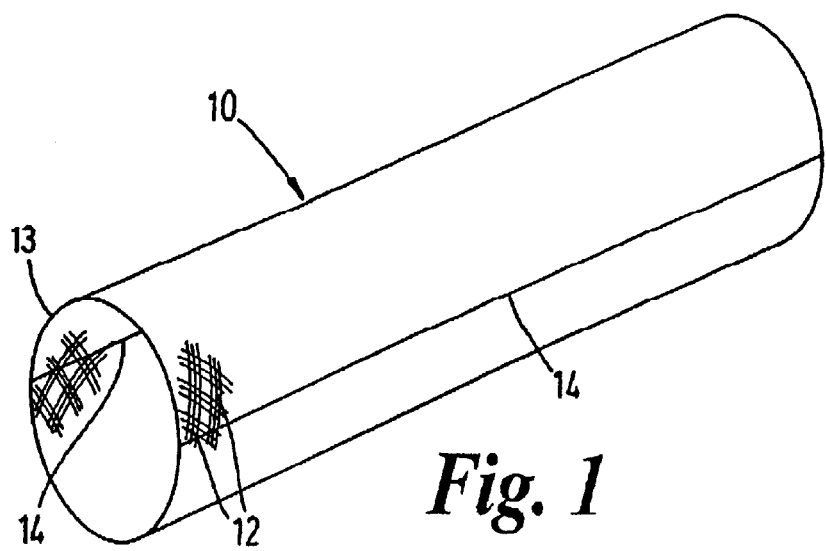
FIG. 1 is a schematic view, in perspective, illustrating a braided tubular article, in the form of a protective sleeve incorporating the principle of the invention.

With reference first to FIG. 1, a braided tubular article in accordance with the present invention is shown in a first embodiment as a sleeving product, a protective sleeve 10, for passing over an elongate substrate (not shown) such as a bundle of electrical wires or like members. The sleeve 10 is formed by braiding of helically extending yarns 12. Preferably yarns 12 are monofilaments and conveniently selected from a large group of so-called engineering plastics materials of which polyester, Peek and nylon are exemplary. In an exemplary manufacture, three ends of flame-resistant polyester monofilaments each having a diameter of 0.254 mm (0.010 inches) are loaded onto the carriers of a 52-carrier braider and braided into a tubular form 13. Warp elements 14, formed, for example, of flame-retardant nylon monofilaments each having a diameter of about 0.38 mm (0.015 inches), are loaded onto two warp carriers located diametrically opposite to one another so as to be interlaced between the helically-extending braided yarns as the tubular form is produced, spaced apart circumferentially of the tubular form by 180°. The warp elements extend substantially lengthwise of the tubular form and are substantially inelastic lengthwise thereof.

The sleeve is made with the tubular form 13 braided in the radially expanded, backed-up state with the yarns thereof helically extending at a relatively large inclination with respect to the longitudinal axis of the helix, that is, with small helix pitch, so as to be capable of significant axial extension and radial contraction by increase in the helix pitch of the tubular form.

The sleeve is braided with the yarns 12 and warp elements 14 under such tension that the warp elements are coupled to the yarns by friction between them that is sufficient to restrain them in position in the backed-up state. That is, the warp elements comprise restraining elements and the level of friction is chosen to permit the backed up article to be handled and shipped without spontaneous or inadvertent extension, but to be readily extended when required by pulling the braided tubular form under axial tension in excess of a predetermined threshold level defined by the friction.

In eventual use to protectively sleeve items forming a substrate, the backed-up sleeve 10 is fed onto the items to be protected and axially extended by applying such threshold-exceeding tension force to the braided tubular form that in extending it is pulled down so that it hugs the substrate.

Once the sleeve is extended and contracted onto a substrate the increased braid helix pitch that goes with extension means that the sleeve behaves in the manner of known braided sleeves in being able to retain the contracted form, notwithstanding that the warp elements may extend for only a part of the extended sleeve length.

The coupling between the warp elements and yarns is by frictional engagement only and the warp elements are floating relative to the tubular form in respect of their axial positions, particularly those assumed after extension when frictional forces have been overcome which may be considered indeterminate.

However, insofar as the warp elements do extend axially for at least part of the extended sleeve length, their resilience and the aforementioned frictional engagement with the braid yarn inhibit the tubular form from undergoing permanent changes in axial length, particularly contraction.

Additionally, insofar as the warp elements extend axially for at least part of the extended sleeve length, that part of the sleeve can be bent along its length. This is illustrated in FIGS. 2(a) and 2(b) which show end and side views respectively of the sleeve 10 extended lengthwise in use and also bent along its length into a curved, elbow shape.

Figure 2A:
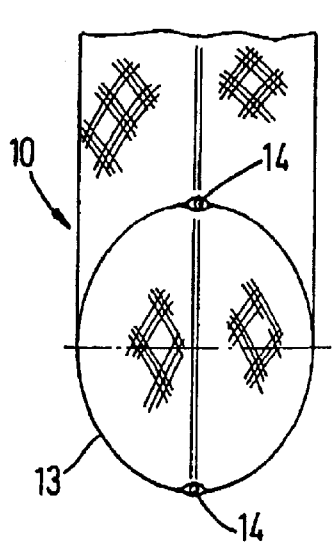
FIGS. 2(a) and 2(b) are end and side views respectively of a sleeve of FIG. 1 illustrating an important aspect of the invention by a 90° bend in the sleeve.
Figure 2B:
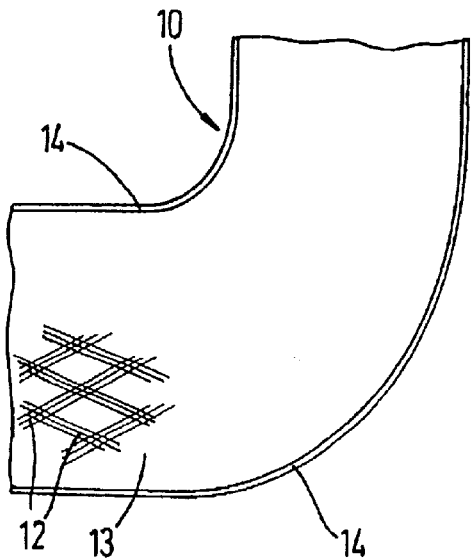

The end view of FIG. 2(a) shows the sleeve orientated about its longitudinal axis so that the warp elements 14 are at the upper and lower extremities of the sleeve and, at the end of the sleeve extend perpendicular to a cross-sectional plane in the plane of the drawing. The side view of FIG. 2(b) illustrates the warp elements 14 extending lengthwise thereof in the plane of the drawing, a first plane, orthogonal to the cross-sectional plane.

Having regard to the above explanation that the warp elements and braided yarns retain the relative positions assumed as a result of manually applying axial tension to the sleeve, then when such tension results in a curvature of the sleeve in the first plane containing the warp elements, the shape is retained thereafter, but in a second plane, orthogonal thereto, wherein the warp elements and yarns flex without relative movement, the sleeve itself is flexible.

Figure 3:
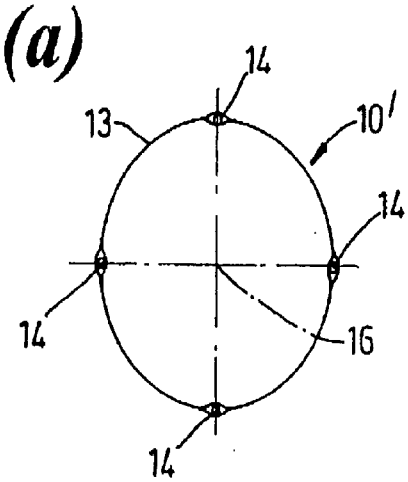
FIG. 3 is an end view of a second embodiment of the braided sleeve of FIG. 1.

A second embodiment of a sleeve $10^1$, is shown in end view in FIG. 3, having four warp elements 14 disposed equidistantly spaced at 90° intervals. The sleeve $10^1$, when extended axially, will retain its shape in three orthogonal directions, namely, in the direction of its longitudinal axis 16 and in the two orthogonal planes containing the warp elements, as well as any combination of these two orthogonal planes; that is any direction in the cross-sectional plane of the drawing.

In the embodiments 10 and $10^1$ described and illustrated, the warp elements have been disposed in diametrically opposed pairs. It will be appreciated that such warp elements may be disposed in other, even or odd, numbers circumferentially.

In any of the above embodiments, it is preferred that the warp elements 14 be relatively inelastic in the axial direction so that the extension of the sleeve which takes place under the tension forces applied by a worker installing the braided sleeving product is permanent with no spring-back or axial contraction of the sleeve when it is released due to elasticity of the warp elements.

The embodiments described above have, as an example, braid yarns of multiple polyester filaments and warp elements of monofilaments of nylon. The warp elements may comprise other materials, as with the braid yarns, and any construction may comprise the same material for the braid yarns and the warp elements. The warp elements may comprise other than single monofilaments; they may comprise up to three monofilaments bundled in twisted or untwisted configuration or in the form of braided or knitted beads.

In order to prevent unraveling or fraying of the braided sleeve, it is preferred that a saturant, such as a water-based acrylic composition, be applied. The saturant also serves as a medium coupling the warps to the braided elements and supplementing the frictional forces to prevent spontaneous or unintentional pull down. However, following application of the saturant, it is important if the thermoplastic monofilaments are used in the braid that the product be allowed to air dry, as heating will induce an elastic memory urging the sleeve to return to its radially-expanded state following pull down.

It will be appreciated that where a sleeve is not required to retain a post-extension bend, then the coupling between warp elements and braid yarns that inhibits change in length is possibly redundant after the extension has been effected. It is, therefore, possible for such coupling to be effected predominantly or wholly by the type of disruptable bond described above, with less, or even effectively zero, contributions from frictional engagement between the warp elements and braid yarns.

It will furthermore be appreciated that if meaningful frictional engagement between the warp elements and yarns of the tubular form does not result from braiding of the warp element with those yarns, that is, they do not comprise restraining elements by virtue of the braiding operation, and relies upon some adhesive or like bond, such bond may be provided by other than an anti-fraying agent and be specific to the purpose.

Where there is a requirement for additional shape retention after extension of the sleeve then braided-in warp elements with frictional coupling are essential. As described above, it is convenient for the tubular sleeve to be manufactured with the warp elements floating with respect to the braided yarns so that they hold the sleeve in the backed-up state prior to use but do not interfere with the axial extension of the latter, although as a consequence, the final axial positions in the extended sleeve of such floating warp elements is uncertain. Where the warp elements are desired to permit an extended sleeve to retain a curved shape at a specific region along its length, relying upon such floating warp elements to be at such positions as a result of tubular body extension may be inappropriate.

It is possible to attach each warp elements to the braided tubular form at a specific or unitary point where the warp element crosses a braid yarn that will, in the extended sleeve, be at a predetermined position along its length, so that as the sleeve is extended by subjecting the braided tubular form to tension the braided yarns and warp elements are displaced with respect to each other except at the respective attachment points, which define the final positions of the warp elements in the extended sleeve.

Such point attachment of the warp element to the braid yarns of the tubular form may be by some mechanical inter-weaving or knot-tying operation as part of the braiding operation or by spotting each warp element of the backed-up sleeve (in which the warp elements are floating) with an adhesive or solvent whereby the warp elements become locally attached to the adjacent braid yarns with sufficient strength to resist the frictional forces associated with axial extension of the tubular form and supplementary friction of an anti-fraying composition applied to the tubular sleeve.

It will be understood that although the above description has concentrated on a tubular article in the form of a sleeve for protecting members by being pulled down radially onto such members as the sleeve is extended, this is for the purpose of description only and the tubular article may have more general applicability wherein, for example, it is transformed from a readily transported backed-up state into an extended state prior to use as something other than a protective sleeve, and it is intended that all reference to "sleeve" may have the more general term "tubular article" substituted therefor.

What is claimed is:

1. A braided tubular article comprising a plurality of yarns extending helically with respect to a longitudinal axis and interbraided with respect to each other into a tubular form, of small helix pitch capable of significant axial extension by relative movement between the yarns, a plurality of monofilament restraining elements extending axially of the tubular form, restraining means coupling the monofilament restraining elements to the braid yarns at least adjacent to the ends of the tubular article to inhibit axial extension thereof in response to an axial extension force applied to the tubular form, the restraining means being releasable when tensioned to release the braided yarns to permit axial extension of the tubular article in response to a said axial extension force in excess of a predetermined threshold level.

2. A tubular article according to claim 1, wherein said monofilament restraining elements which comprise warp elements are interlaced with said tubular article.

3. A tubular article according to claim 2, wherein the warp elements are coupled to the braided yarns of the tubular body to inhibit said axial extension by frictional engagement between them.

4. A braided tubular article according to claim 2, wherein each warp element comprises the same material as the interbraided yarns.

5. A braided tubular article according to claim 1, wherein each monofilament restraining element is the same length as the tubular article when the tubular article is in a state of axial contraction.

6. A braided tubular article according to claim 5, wherein at least one monofilament restraining element comprises a bundle of monofilaments.

7. A braided tubular article according to claim 6, wherein said bundle comprises monofilaments twisted together.

8. A braided tubular article according to claim 2, wherein the monofilament restraining elements are selected from the materials comprising nylon, Peek and polyester.

9. A tubular article according to claim 1, wherein the monofilament restraining elements are coupled to the braided yarns of the tubular form by a disruptable adhesive bond.

10. A tubular article according to claim 9, wherein the tubular article is impregnated or coated with an anti-fraying agent that comprises said disruptable bond.

11. A braided tubular article according to claim 10, wherein the anti-fraying agent is a water-based acrylic composition.

12. A tubular article according to claim 1, wherein each restraining element is coupled at a unitary predetermined attachment point thereof to the tubular form in a permanent attachment therewith.

13. A braided tubular article according to claim 1, wherein each said restraining element is substantially inelastic lengthwise thereof.

14. A braided tubular article according to claim 13, wherein said plurality of monofilament restraining elements are equidistantly spaced with respect to each other about the circumference of the tubular article.

15. A braided tubular article according to claim 14, wherein said monofilament restraining elements are disposed as at least one diametrically opposed pair of elements.

* * * * *